US007895041B2

(12) United States Patent
Dickson et al.

(10) Patent No.: US 7,895,041 B2
(45) Date of Patent: Feb. 22, 2011

(54) TEXT TO SPEECH INTERACTIVE VOICE RESPONSE SYSTEM

(76) Inventors: Craig B. Dickson, 4059 Monarch Place, Victoria, British Columbia (CA) V8N 4B7; Stephen J. Eady, 3957 Emerald Place, Victoria, British Columbia (CA) V8P 4T8; James R. Woolsey, 3765 Belgrave Road, Victoria, British Columbia (CA) V8Z 5A1

( * ) Notice: Subject to any disclaimer, the term of this patent is extended or adjusted under 35 U.S.C. 154(b) by 970 days.

(21) Appl. No.: 11/741,577

(22) Filed: Apr. 27, 2007

(65) Prior Publication Data

US 2008/0270137 A1 Oct. 30, 2008

(51) Int. Cl.
*G10L 15/00* (2006.01)
*G10L 21/00* (2006.01)

(52) U.S. Cl. ........................ 704/258; 704/270; 704/274

(58) Field of Classification Search ....................... None
See application file for complete search history.

(56) References Cited

U.S. PATENT DOCUMENTS 3,828,132 A * 8/1974 Flanagan et al. ............ 704/268
5,850,629 A * 12/1998 Holm et al. ................. 704/260
5,890,117 A * 3/1999 Silverman ................... 704/260
6,240,390 B1 * 5/2001 Jih ............................. 704/267
6,289,312 B1 * 9/2001 Raman ........................ 704/270
6,961,704 B1 * 11/2005 Phillips et al. .............. 704/268
7,139,709 B2 * 11/2006 Schmid et al. .............. 704/258
2007/0033049 A1 * 2/2007 Qin et al. .................... 704/260

OTHER PUBLICATIONS

Eady et al., "A Microcomputer-Based Speech-Output System for Generating Automated Weather Reports", IEEE Pacific Rim Conference on Communications, Computers and Signal Processing, May 9-10, 1991.*

* cited by examiner

*Primary Examiner*—Brian L Albertalli
(74) *Attorney, Agent, or Firm*—Gordon Thomson

(57) ABSTRACT

A text to speech interactive voice response system is operable within a personal computer having a processor, data storage means and an operating system. The system comprises an input subsystem for receiving a text data stream from a source device in a predetermined format; a process control subsystem for converting the text data stream into corresponding output data items; an audio record subsystem for recording audio data to be associated with each output data item; and, a broadcast control subsystem for generating an audio broadcast based on the output data items. There is also disclosed a system management and control subsystem for user interface with the system.

19 Claims, 1 Drawing Sheet

TEXT TO SPEECH INTERACTIVE VOICE RESPONSE SYSTEM

FIELD OF THE INVENTION

This invention relates to data processing using computer hardware and computer software and more particularly, this invention relates to a text to speech interactive voice response system.

BACKGROUND OF THE INVENTION

Particularly in the area of transportation, many organizations rely heavily on the dissemination of clear and concise audio information. For example, Automatic Terminal Information Services are a key component of airports of all sizes, and are used by air traffic control personnel to create, monitor and broadcast critical information to incoming and departing aircraft. In the past, such broadcasts were recorded manually. This was labor intensive and costly. Therefore there is a need for a system that can create these broadcasts automatically and effortlessly while still retaining the high quality that is required when broadcasting mission-critical information.

SUMMARY OF THE INVENTION

The present invention meets the need for a system that can automatically convert text messages to speech messages for broadcast in a clear and natural voice. The system can be customized for local languages and accents. Incoming text data may be highly abbreviated (such as weather or aviation information) or in the form of standard orthography. The text data are converted into high quality voice output in preparation for broadcast. Errors originating in the incoming text data are flagged and optionally logged. The user is therefore able to verify the final message for accuracy before broadcast, and can perform a vocabulary search if missing words or errors are found. The invention provides a cost-effective solution to broadcast, and a dramatic increase in organizational efficiency.

DETAILED DESCRIPTION OF THE INVENTION

Figure 1:
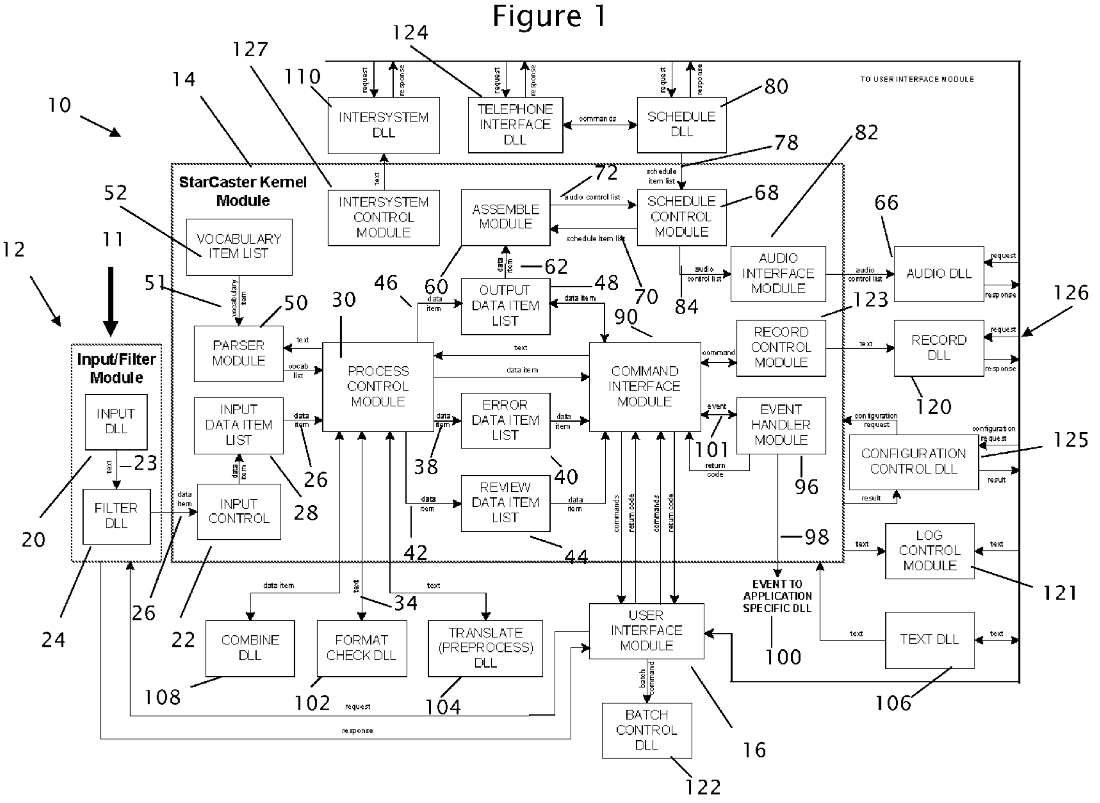
FIG. 1 is a schematic of the text to speech conversion system of one example of the invention.

The invention (10) is a general-purpose text-to-speech, interactive voice response broadcasting system for various computer-based applications. It is a modular system that is designed around a central Kernel Module (14) that links to a set of service modules that perform various functions. These modules can be standalone executables or dynamic link libraries. The interface to each module is well defined, thus allowing various application- or user-specific modules to be implemented that fulfill the requirements of a set of specific needs.

The invention consists of a number of process control subsystems and storage modules, plus a multiplicity of lower level modules that supply the functionality required by other components of the system. All broadcast information that is saved within or transported throughout the system is maintained in specific kinds of storage structures.

The Storage Structures

The storage structures define the main storage units used by the system. They are the Audio Data Item (62), the Input Data Item (26), the Output Data Item (46), the Vocabulary Item (51), and the Schedule Data Item (78).

The Audio Data Item (62)

An Audio Data Item (62) is a text string reference to audio data that is used to generate audio broadcasts. If the system is configured to store audio data in disk files, the item references a file name. If the system is configured to store audio data in computer memory, the item references a memory offset and data length.

The Input Data Item (26)

An Input Data Item (26) is used to save and transport input data information. It is used to generate the Output Data Items (46). It consists of a text string name value, a text string type value, a text string language value, a text string raw text value, a text string error structure, and a numerical time stamp value. The name, type, and language values are sufficient to uniquely identify an instance of an Input Data item. The type value is also used to determine how the associated raw text is to be processed, and how the item is to be maintained by the system.

The Output Data Item (46)

An Output Data Item (46) is used to save output data information. It is derived from an Input Data Item (26) and consists of a text string name value, a text string type value, a text string language value, a text string raw text value, a text string processed text value, an Audio Control List (72) (a list of Audio Data Items), and a numerical time stamp value. The name, type, and language values are derived from the antecedent Input Data Item and are sufficient to uniquely identify an instance of an Output Data item. The type value is also used to determine how the item is to be maintained by the system.

The Vocabulary Item (51)

A broadcast message is assembled using a technique called "speech concatenation", which joins the individual speech units into longer phrases and sentences. Speech units are individual word or phrases that are associated with recorded and processed audio data. The method of speech concatenation that is used by the system is critical to producing a high quality of voice output. The invention uses a speech concatenation technique that is based upon "intonational phrases", and which takes in account the intonation and timing aspects of human speech. Concatenation systems that do not take these aspects into account often produce voice output that sounds "choppy" and disjointed.

A Vocabulary Item (51) associates the text of a speech unit with recorded audio data information. It consists of a text string speech unit, an Audio Data Item that references the audio data, and a numerical duration value. The speech unit and language values are used to uniquely identify a Vocabulary Item.

The Schedule Data Item (78)

Schedule Data Items (78) are used to save and transport scheduling information and to control the audio broadcasts generated by the system. Each Schedule Data Item consists of a text string name value, a text string type value, and a text string language value. These values can either be used to identify an Output Data Item or specify control information for a broadcast.

The Storage Modules

When managing and processing data items, the system needs mechanisms from which it can store and reference the data as needed. To accomplish this, the system contains a number of persistent storage lists: the Input Data Item List (28), the Error Data Item List (40), the Review Data Item List (44), the Output Data Item List (48), and one or more Vocabulary Item Lists (52).

The Input Data Item List (28)

The Input Data Item List is a container class for Input Data Items (26) that have been received from the Input/Filter Module (12). It is designed as a first in first out list.

The Error Data Item List (40)

The Error Data Item List is a container class for Input Data Items whose raw text cannot be completely processed by the Process Control Module (30). It is designed as an alphabetically sorted list that is based upon the name and type values.

The Review Data Item List (44)

The Review Data Item List is a container class for Input Data Items that must be reviewed by a system user through the User Interface Module (16) before processing by the Process Control Module (30). It is designed as an alphabetically sorted list that is based upon the name and type values.

The Output Data Item List (48)

The Output Data Item List is a container class for Output Data Items that have been successfully processed by the Process Control Module. It is designed as an alphabetically sorted list that is based upon the name and type values.

The Vocabulary Items Lists (52)

A Vocabulary Items List is a container class for Vocabulary Items (51). There must be a separate Vocabulary Item List for each language that is supported by the system. It is designed as an alphabetically sorted list that is based upon the word and phrase values.

The Broadcast Data Control Subsystems

The Broadcast Data Control Subsystem controls the life cycle of the data that are used to generate broadcasts.

The Input Subsystem

The Input Subsystem consists of the Input Control Module (22) and the Input/Filter Module (12).

The Input Control Module (22) is part of the Kernel Module (14) process. It loads and manages the Input/Filter Module (12) and adds new Input Data Items (26) to the Input Data Item List (28). This subsystem is not required if the system can acquire data in some other means.

The Input/Filter Module (12) usually consists of two sub modules. The Input DLL (20) module is an application specific module that acquires raw text (11) with a predetermined application-specific format from some source device. This application-specific text (23) is passed to the Filter DLL (24) module, another application-specific module. The Filter DLL (24) module scans the input text, and selects strings of text that conform to specified properties, taken from within the input text data stream. Each string of selected text is classified into a type value and given a name value. A new Input Data Item (26) is generated for each language supported. These are passed to the Input Control Module (22) for inclusion in the Input Data Item List (28).

The Audio Record Subsystem

The Audio Record Subsystem consists of the Record Control Module (123) and the Record DLL (120) module. Through the Command Control Subsystem, described below, it allows users to record the audio data to be associated with specific Output Data Items. The Record Control Module (123) is a part of the Kernel Module (14) process that loads and manages an application-specific Record DLL module. The Record DLL module must implement an interface to one or more audio input devices. A variation of the Record DLL module is an interface to a third party text-to-speech system.

The Process Control Subsystem

The Process Control Module (30) is the data processing subsystem. Input Data Items (26) from the Input Data List (28) are processed to create Output Data Items (46) that are stored in the Output Data Item List (48). Data processing is a one to three step process that is controlled by the attributes of the Input Data Item type value. If the Input Data Item type value specifies that a system user must preview it (first value type), then the Input Data Item (42) is placed in the Review Data Item List (44). It is later processed through the Command Interface Module (90) using the processing steps below.

In some configurations, information in some Input Data Items (26) of specified types (second value type) may need to be merged with previously processed data. The merging process is done through the Combine DLL (108) module that can be implemented to modify items in application-specific ways.

If the raw text value associated with an Input Data Item of a specific type (third value type) is encoded and requires some kind of translation, rules must be generated for an application specific version of the Translate DLL (104) module that modifies the raw text so that it is in a usable form.

If the raw text value associated with an Input Data Item has a well-defined text format (fourth value type) and if rules have been defined for checking that text format, then the Format Check DLL (102) module is used to process the raw text. If the text fails the format check, the Input Data Item is put into the Error Item List (40) for correction through the Command Interface Module (90). If the text passes the format check, the text returned from the Format Check DLL (102) module replaces the raw text value.

The processed text and Input Item language value are then passed to the Parser Module (50). This module attempts to decompose the processed text into a sequence of speech units that correspond to speech units in Vocabulary Items (51) in the Vocabulary Item List (52) associated with the language value. If the processed text can be completely decomposed into a sequence of speech units, then a list of the Audio Data Items (Audio Control List) associated with the Vocabulary Items is generated, and an Output Data Item (46) is also generated and placed in the Output Data Item List (48). If the processed text cannot be decomposed, then the Input Data Item (26) is placed in the Error Data Item List (40) for correction through the Command Interface Module (90).

The Broadcast Control Subsystem

In order to be operational, the system must generate audio broadcasts to at least one audio device. For the purpose of the system, an audio device is defined as a specific sound output device (such as a device that is associated with a telephone interface or a computer sound card), or as saved audio data. Each audio device used by the system must be uniquely identified so that different broadcasts can be directed to specific audio devices.

The Broadcast Control Subsystem is the subsystem that controls the generation of the audio broadcasts. It is composed of the Assemble Module (60), the Schedule Control Module (68), the Schedule DLL (80) module, the Audio Interface Module (82), and Audio DLL (66) module. This is the only subsystem in which an instance of all sub-components is required. The Schedule Control Module (68) is the main control module of the subsystem. It initializes all other components and directs information flow for the subsystem.

The Audio Interface Module (82) loads and communicates with the Audio DLL (66) module. The Audio DLL (66) module is an application-specific DLL module. When an Audio Control List (84) is passed to it, this module generates audio broadcasts on specified audio devices.

The Schedule DLL (80) module is an application-specific DLL module that controls what is broadcast, when it is broadcast, and on what audio device it is broadcast. When an audio broadcast is to be done, it must pass a list of Schedule Data Items (78) to the Schedule Control Module (68). The list defines the structure and contents of a broadcast. The Schedule DLL (80) module can interface with other devices, such as a Telephone Interface DLL (124) module. This allows the system to respond to the telephone device as any other audio device.

For each audio broadcast that is associated with an audio device, the Assemble Module (60) creates Audio Control list (72) using information from the list of Schedule Data Items (70) that has been received from the Schedule DLL (80) module. Each Schedule Data Item can reference an Output Data Item or a command string that controls the audio broadcast. Each Output Data Item (62) is associated with a list of Audio Data Items. The lists of Audio Data Items and the command strings are assembled to create the Audio Control List (84). This Audio Control List controls the concatenation of Audio Data Items, which are then sent to the audio device.

The System Management and Control Subsystems

The System Management and Control Subsystems are the subsystems that define the user interface, configuration, and record keeping for the system.

The Command Subsystem

The Command Subsystem allows the system to interact directly with system users. Although it is not essential that there be a user interface component to a system, it is usually needed. This subsystem is made up of the Command Interface Module (90) in the Kernel Module (14), and a User Interface Module (16).

The Command Control Module (90) permits access to the Data Item Lists (28), (40), (44), (48) and (52), so that Data Items can be viewed, modified, or deleted. It also allows user access (98) to application-specific DLL modules (100), using messages through the Event Handler Module (96). For this functionality to be available, application-specific DLL modules are implemented to include the Event Handler functions (101).

The User Interface Module (16) is an application-specific module that allows users access to the system. It can be a stand-alone executable that is run locally or remotely. It can also be implemented so that it is run through a web browser or as a DLL module. User Interface Modules will display a graphical user interface, and most will require a Text DLL (106) module that supplies the appropriate text for an application, in the language of the user. This design also allows the User Interface Module (16) to specify extra processing through an application-specific Batch Control DLL (122) module.

The Utility Control Subsystem

The Utility Control Subsystem supplies common functionality to all system components. The Configuration Control DLL (125) module supplies a consistent method of accessing the system configuration system. The configuration system allows for a hierarchy of configuration files and registry sections. Each file or registry section contains a set of section values with associated key values. When a request (126) is made, the configuration system is examined from last to first, or until the section-key value is found. This allows for systems to be configured with local, regional, and default settings.

The Log Control Module (121) supplies a consistent method of logging system information into a common location. All system modules can be implemented to access the log control functions.

The Intersystem Control Subsystem

A specific application can require that two or more systems communicate with one another. The Intersystem Control subsystem permits this communication. The Intersystem Control Module (127) is the Kernel Module (14) that loads and initializes the subsystem. The Intersystem DLL (110) module implements the application requirements for intersystem communication. Since the functionality of this module is application-specific, most of the communication with this module is done using messages through the Event Handler Module (96).

Instruction Set

The Invention also includes a computer software program having a set of instructions for converting text to speech. The set of instructions is formed into a plurality of interdependent modules comprising:

An input/filter process;

An input control process;

A kernel control process;

A parser process;

A schedule control process;

An assembly process;

An audio interface process;

A command interface process; and

A user interface process.

The computer software program modules comprise a plurality of sets of instruction comprising:

A first set of instructions for defining an input/filter process;

A second set of instructions for defining an input control process;

A third set of instructions for defining a kernel control process;

A fourth set of instructions for defining a parser process;

A fifth set of instructions for defining a schedule control process;

A sixth set of instructions for defining an assembly process;

A seventh set of instructions for defining an audio interface process;

An eighth set of instructions for defining a command interface process; and

A ninth set of instructions for defining a user interface process.

The foregoing description of the invention has been presented for illustration purposes and description. It is not intended to be exhaustive or to limit the invention to the precise form disclosed, and other modifications may be possible in light of the above teachings. The example was chosen and described in order to best explain the principles of the invention and its practical application to thereby enable others skilled in the art to best utilize the invention in various embodiments and various modifications as are suited to the particular use contemplated. It is intended that the appended claims be constructed to include other alternative embodiments of the invention except insofar as limited by the prior art.

What is claimed is:

1. A text to speech interactive voice response system operable within a personal computer having a processor, data storage means and an operating system, said system comprising:

a. an input subsystem for receiving a text data stream from a source device wherein:

i. said text data stream has a predetermined format;

ii. said input subsystem comprising an input control module for receiving said input data item and adding the input data item to an input data item list and converting the text data stream into a plurality of input data items;

iii. the input subsystem comprises an input/filter module comprising an Input DLL module for receiving the text data stream having a predetermined application specific format and a filter DLL module for receiving the text data stream from the input DLL module, scanning the text data stream, and selecting strings of text that conform to predetermined properties; and, iv. wherein the filter DLL module further assigns a type value and a name value to each of said selected strings of text thereby creating an input data item corresponding to each of the selected strings of text;

b. a process control subsystem for receiving said plurality of input data items and converting them into a corresponding plurality of output data items, wherein each output data item of said corresponding plurality of output data items comprises a sequence of speech units, and wherein said process control subsystem comprises a process control module adapted for receiving the input data item from the input data item list and processing the input data item in accordance with the type value and name value of the input data item;

c. an audio record subsystem for recording audio data to be associated with each speech unit of said sequence of speech units;

d. a broadcast control subsystem for generating an audio broadcast based on said audio data associated with the sequence of speech units;

e. a system management and control subsystem for user interface with the system; and;

f. wherein a first type value and name value of the input data item specify user preview resulting in the input data item being placed on a review data item list.

2. The system of claim 1 wherein a second type value and name value of the input data item specify merging with a previously processed data item resulting in the input data item and said previously processed data item merging by way of a combine DLL module within said process control module.

3. The system of claim 2 wherein a third type value and name value of the input data time specify translation of the input data item from a non-usable code to a usable code resulting in the input data item being processed by a translate DLL module within the process control module.

4. The system of claim 3 wherein a fourth type value and name value specify that the input data item is in the form of a previously defined format resulting in a format check DLL module processing the input data item, wherein said format check DLL module resides within the process control module.

5. The system of claim 4 wherein the input data item fails said format check DLL processing resulting in the input data time being placed on an error data item list for correction through a command interface module.

6. The system of claim 1 wherein said broadcast control subsystem functions to generate an audio broadcast to at least one audio device being a sound output device, and wherein the broadcast control subsystem comprises an assembly module, a schedule control module, a schedule DLL module, an audio interface module and an audio DLL module.

7. The system of claim 6 wherein said assembly module receives output data items from the output data item list, and wherein the assembly module acts in cooperation with said schedule control module to receive schedule items and incorporate said schedule items into the output data item list to form an audio control list having appropriate speech concatenation.

8. The system of claim 7 wherein the schedule control module receives the schedule items from said schedule DLL, and wherein the schedule items define said speech concatenation.

9. The system of claim 1 wherein said system management and control subsystem comprises a command subsystem comprising a command interface module permitting user access to a vocabulary list, a input data item list, a review data item list, an error data item list and an output data item list so that the user can review, edit or delete data items as required.

10. The system of claim 9 wherein the command interface module communicates with an event handler module for access to application-specific DLL modules.

11. The system of claim 10 wherein the command subsystem further comprises a user interface module for providing access to the system command interface module and for providing the user with a graphic interface.

12. The system of claim 11 wherein the user interface module communicates with a text DLL module for providing the appropriate user language and a batch control DLL for specifying additional processing by the user.

13. The system of claim 9 wherein the system management and control subsystem further comprises a utility control subsystem comprising a configuration control DLL module for providing a consistent method of accessing the system configuration means.

14. The system of claim 13 wherein the utility control subsystem further comprises a log control module for logging system information into a common location.

15. A text to speech conversion method comprising the steps performed by a processor and a plurality of dynamic link libraries, of:

a. receiving a text message;

b. converting said text message into a plurality of sequential text fields;

c. checking each sequential text field to ensure that they conform to a predetermined format;

d. associating each sequential text field of said plurality of sequential text fields with a respective input data item;

e. processing each input data item including the step of associating each input data item with a vocabulary element selected from a pre-recorded list of vocabulary elements;

f. associating said vocabulary element with an audio data file thereby generating an audio control list as an output data item list;

g. assembling said output data item list into an audio message; and, h. broadcasting said audio message.

16. The method of claim 15 further including a preprocessing step performed between step c and step d wherein context sensitive text fields are translated.

17. The method of claim 16 wherein said text message comprises two independent messages and wherein the method further includes a step performed between step c and step d combining said two independent messages into a single output.

18. The method of claim 17 further comprising a step performed after step c of identifying error items in each data input item and placing them on an error data item list for operator review.

19. The method of claim 18 further comprising a step performed of placing data input items requiring operator review on a review data item list.

* * * * *